US011618697B2

(12) United States Patent
Fox et al.

(10) Patent No.: US 11,618,697 B2
(45) Date of Patent: *Apr. 4, 2023

(54) TREATMENT OF TAILINGS STREAMS WITH ONE OR MORE DOSAGES OF LIME, AND ASSOCIATED SYSTEMS AND METHODS

(71) Applicant: Graymont Western Canada Inc., Richmond (CA)

(72) Inventors: Jesse Wayne Fox, West Valley City, UT (US); Michael John Tate, Oregon, OH (US); Jared Ira Leikam, West Jordan, UT (US); Nikolas Andrei Romaniuk, Alberta (CA)

(73) Assignee: Graymont Western Canada Inc., Richmond (CA)

( * ) Notice: Subject to any disclaimer, the term of this patent is extended or adjusted under 35 U.S.C. 154(b) by 81 days.

This patent is subject to a terminal disclaimer.

(21) Appl. No.: 17/316,633

(22) Filed: May 10, 2021

(65) Prior Publication Data

US 2021/0292198 A1 Sep. 23, 2021

Related U.S. Application Data

(63) Continuation of application No. 16/184,689, filed on Nov. 8, 2018, now Pat. No. 11,027,995.

(Continued)

(51) Int. Cl.
*C02F 1/52* (2006.01)
*C02F 1/38* (2023.01)
(Continued)

(52) U.S. Cl.
CPC ............ *C02F 1/5281* (2013.01); *C02F 1/004* (2013.01); *C02F 1/385* (2013.01); *C02F 1/5245* (2013.01);
(Continued)

(58) Field of Classification Search
CPC .................................................. C02F 1/5281
See application file for complete search history.

(56) References Cited

U.S. PATENT DOCUMENTS

| 3,502,575 A | 3/1970 | Hepp et al. |
| 4,173,532 A | 11/1979 | Keoteklian |
| (Continued) | | |

FOREIGN PATENT DOCUMENTS

| CA | 1138361 A | 12/1982 |
| CA | 1291957 C | 11/1991 |
| (Continued) | | |

OTHER PUBLICATIONS

BGC Engineering, Inc., "Oil Sands Tailings Technology Review", Oil Sands Research and Information Network, University of Alberta, School of Energy and the Environment, Edmonton, Alberta. OSRIN Report No. TR-1, Jul. 2010.

(Continued)

*Primary Examiner* — Peter Keyworth
(74) *Attorney, Agent, or Firm* — Perkins Coie LLP

(57) ABSTRACT

Methods and systems for treating oil sands tailings streams using multiple dosages of lime are disclosed herein. In some embodiments, the method comprises providing a tailings stream including 3-40% solids by total weight, combining the tailings stream with a first dosage of lime to produce a first mixture having a pH of less than 12.0, and then combining the first mixture with a polymer to produce a second mixture. In some embodiments, the method can further include combining the second mixture with a second dosage of lime to produce a third mixture having a pH greater than 12.0, and dewatering the third mixture in a centrifuge unit and/or a pressure filtration unit to produce a product stream having 55% or more solids by weight.

20 Claims, 6 Drawing Sheets

Related U.S. Application Data

(60) Provisional application No. 62/583,327, filed on Nov. 8, 2017.

(51) Int. Cl.
  *C02F 1/00* (2023.01)
  *C02F 1/56* (2023.01)
  *C02F 103/10* (2006.01)
  *C02F 11/127* (2019.01)

(52) U.S. Cl.
  CPC .............. *C02F 1/56* (2013.01); *C02F 11/127* (2013.01); *C02F 2103/10* (2013.01); *C02F 2209/06* (2013.01)

(56) References Cited

U.S. PATENT DOCUMENTS

| | | |
|---|---|---|
| 4,225,433 A | 9/1980 | Liu et al. |
| 4,229,295 A | 10/1980 | Krofchak |
| 4,240,897 A | 12/1980 | Clarke |
| 4,282,103 A | 8/1981 | Fuhr et al. |
| 4,414,117 A | 11/1983 | Yong et al. |
| 5,118,219 A | 6/1992 | Walker |
| 5,575,922 A | 11/1996 | Green et al. |
| 5,846,314 A | 12/1998 | Golley |
| 6,267,250 B1 | 7/2001 | Leung et al. |
| 7,695,612 B2 | 4/2010 | Erasmus et al. |
| 10,369,518 B2 | 8/2019 | Tate et al. |
| 11,027,995 B2 | 6/2021 | Tate et al. |
| 2011/0042319 A1 | 2/2011 | Remy |
| 2011/0192769 A1 | 8/2011 | Garland |
| 2012/0145646 A1 | 6/2012 | Bae et al. |
| 2013/0019780 A1 | 1/2013 | Karimi et al. |
| 2013/0187087 A1 | 7/2013 | Scheurman |
| 2013/0206702 A1 | 8/2013 | Lin et al. |
| 2014/0054231 A1 | 2/2014 | Spence et al. |
| 2014/0072653 A1 | 3/2014 | Buschmann |
| 2014/0116946 A1 | 5/2014 | Mikula et al. |
| 2015/0034530 A1 | 2/2015 | Speirs et al. |
| 2016/0304366 A1 | 10/2016 | Moore et al. |
| 2017/0182431 A1 | 6/2017 | Gupta et al. |
| 2018/0065887 A1 | 3/2018 | Ingram et al. |
| 2018/0099883 A1 | 4/2018 | Wilson et al. |
| 2019/0055149 A1 | 2/2019 | Tate et al. |
| 2019/0135663 A1 | 5/2019 | Tate et al. |

FOREIGN PATENT DOCUMENTS

| | | |
|---|---|---|
| CA | 2188064 A1 | 4/1998 |
| CA | 2522031 C | 2/2013 |
| CA | 2824543 A1 | 2/2014 |
| CA | 2792786 A1 | 4/2014 |
| CA | 2825513 A1 | 4/2014 |
| CA | 2977524 A1 | 2/2018 |
| WO | 2013096787 A1 | 6/2013 |

OTHER PUBLICATIONS

International Search Report and Written Opinion dated Jan. 21, 2019, International Application No. PCT/US2018/000228, 14 pages.
International Search Report and Written Opinion dated May 28, 2019, International Application No. PCT/US2018/059863, 13 pages.
CNRL Presentation "Lime Coagulation of Oil Sand Tailings" Feb. 19, 2017.
Lime in MFT Exploratory Work Presentation "Current Work on Lime Addition to MFT" Oct. 11, 2016.
Morgenstern Presentation "Lime as a Coagulant" Graymont Inc., Apr. 26, 2017.
Romaniuk et al., "Effect of Lime Coagulation on Strength and Atterberg Properties of Clays in Oil Sands Tailings" Clay Mineral Society Conference, Jun. 7, 2017.
Stagegate Presentation "Texas A&M Update" May 18, 2017.
Tate M., et al. "Impacts of Calcium Compounds on Oil Sands Water Chemistry" 2016 White Paper.

TREATMENT OF TAILINGS STREAMS WITH ONE OR MORE DOSAGES OF LIME, AND ASSOCIATED SYSTEMS AND METHODS

CROSS-REFERENCE TO RELATED APPLICATION

This patent document is a continuation application of U.S. patent application Ser. No. 16/184,689, filed on Nov. 8, 2018, which claims the benefit of priority to U.S. Provisional Application 62/583,327, filed on Nov. 8, 2017, the disclosures of which are incorporated herein by reference in their entireties.

TECHNICAL FIELD

This application relates to systems and methods for promoting dewatering of tailings streams using lime. In some embodiments, tailings streams from oil sands or mining operations are mixed with a polymer and one or more dosages of lime additive to promote dewatering of the tailings streams.

BACKGROUND

The extraction of bitumen from oil sands has been traditionally performed using the Clark Hot Water Extraction (CHWE) process or variants thereof. A tailings slurry, defined as whole tailings, is produced as a byproduct of the CHWE process, and can include water, sand, clay, and residual bitumen particles that are suspended in the extraction water. Coarse sand particles (e.g., >44 µm) can be easily removed from whole-tailings, but removal of finer particles (fines) can be more problematic. A portion of the remaining fines, water, and residual bitumen form a slurry that is about 10-15% solids by mass, which after a number of years can settle to be about 20-40% solids by mass. This slurry is referred to as fluid fine tailings (FFT) and/or mature fine tailings (MFT), and can remain for decades in a fluid state without further aggregation or settling. Slow consolidation, limited solids strength, and poor water quality of the FFT/MFT limits options for reclamation and has resulted in the formation of large tailings ponds.

A number of different technologies have been tried to improve the reclamation of FFT/MFT. Some of these technologies include whole-tailings treatment, non-segregating treatment (NST) production, composite tailings (CT) production, tailings reduction operations (TRO), atmospheric drying, or treatment with polymers. Furthermore, some of these technologies include treating the FFT/MFT using gypsum. These methods, however, have worked with only limited success and many technologies yield treated tailings that require additional treatments before reclamation is possible. For example, when using gypsum to treat FFT and/or MFT, the resulting release water contains high concentrations of soluble calcium, which can impair effectiveness of the subsequent extraction process. There currently exists over a billion cubic meters of FFT/MFT in tailings ponds. As such, there is a need for an improved method and process to treat oil sands tailings to provide an effective reclamation option.

DETAILED DESCRIPTION

A method and system of dewatering tailings streams using a single or multiple dosages of a lime-based additive is described in detail herein in accordance with embodiments of the present technology. Numerous specific details are set forth in the following description and figures to provide a thorough and enabling description of embodiments of the technology. One skilled in the relevant art, however, will recognize that the technology can be practiced without one or more of the specific details. In other instances, well-known structures or operations are not shown or are not described in detail to avoid obscuring aspects of the technology. In general, alternatives and alternate embodiments described herein are substantially similar to the previously described embodiments, and common elements are identified by the same reference numbers.

Figure 1:
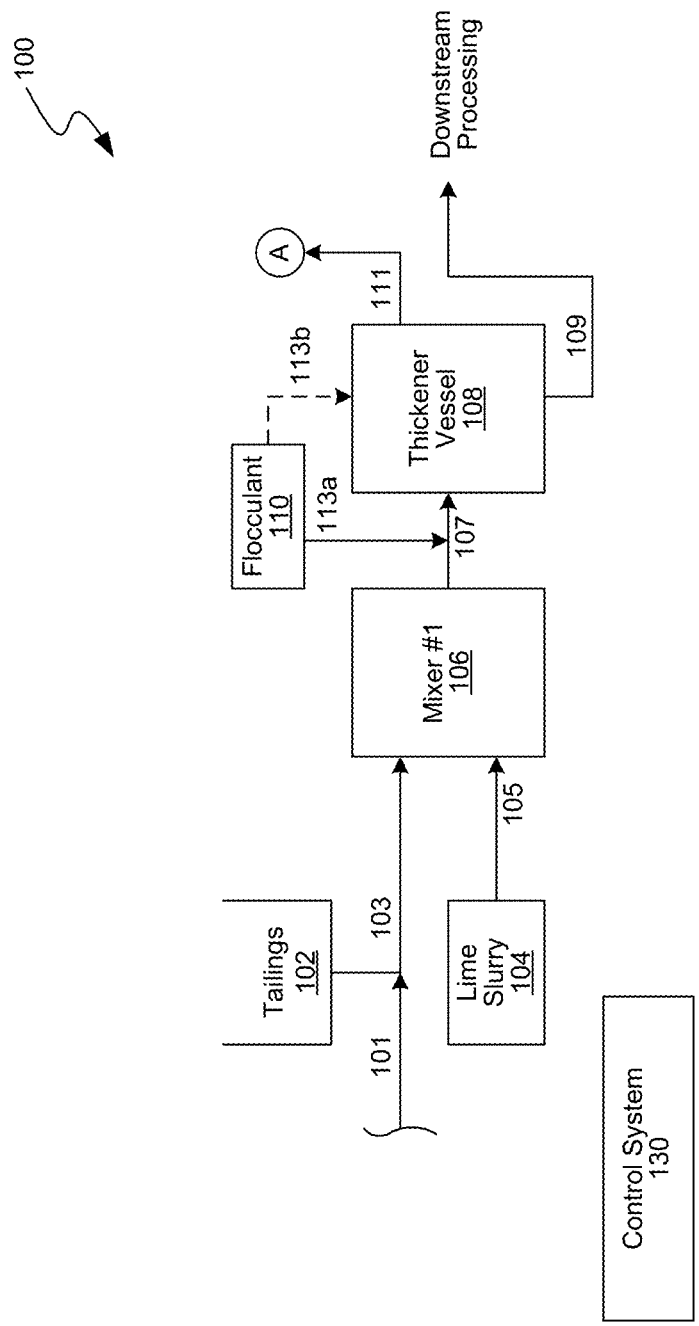
FIG. 1 is a schematic flow diagram of a tailings dewatering system, configured in accordance with embodiments of the present technology.

FIG. 1A is a schematic flow diagram of a tailings dewatering system 100 ("system 100"). The system 100 includes a tailings holding reservoir 102 (e.g., a pond, diked area, tank, etc.) including tailings 103 contained therein, and a lime holding reservoir 104 (e.g., a tank) including a lime slurry 105 (e.g., a lime additive) contained therein. The tailings 103 can originate from oil sands operations, and generally include the remains of the oil sands after the extraction of bitumen therefrom. For example, tailings can include whole-tailings (WT), thin fluid tailings (TFT), fluid fine tailings (FFT), hydro-cyclone overflow or underflow and/or mature fine tailings (MFT) (referred to collectively as "tailings"). In addition, tailings can originate from the extraction of minerals (e.g., copper, gold and/or uranium) from other mining operations. The tailings 103 can come from the tailings holdings reservoir 102 or directly from another process 101 (e.g., an extraction process) without being routed through the tailings holding reservoir 102. The tailings 103 in the tailings holding reservoir 102 can be slightly alkaline, having a pH level of about 7.5-8.5, and the lime slurry 105 in the lime holding reservoir can be alkaline, having a pH level greater than or equal to about 12.0.

The tailings 103 is combined with a dosage of the lime slurry 105 in a first vessel 106 (e.g., a mixer) to produce a lime-tailings mixture 107 having a first composition and a pH equal to or less than about 12.0. For example, the pH of the lime-tailings mixture 107 may be equal to or less than about 11.9, 11.8, 11.7, 11.6 or 11.5. In addition to or in lieu of the foregoing, the amount of soluble calcium levels of the lime-tailings mixture 107 may be equal to or less than 30 mg/L, 25 mg/L, 20 mg/L. The dosage of lime slurry 105 reacts with the tailings 103 to remove at least a portion of the bicarbonates present in the tailings. In some embodiments, the lime-tailings mixture 107 can then be diluted (e.g., with process water) to contain about 3% solids by weight. Dilution of the lime-tailings mixture 107 can help promote better flocculation and speed the settling rate of flocculated solids.

As shown in the illustrated embodiment, after the tailings 103 and lime slurry 105 are combined, the lime-tailings mixture 107 is then combined with a flocculant 110. This can occur in-line via line 113a and/or in a second vessel 108 (e.g., a thickener or holding reservoir) via line 113b. The lime-tailings mixture 107 can separate (e.g., via settling) over a period of time to produce a first stream 109 substantially comprising solids, and a second stream 111 substantially comprising process water. In some embodiments, the addition of the flocculant 110 to the lime-tailings mixture 107 is based on (a) the first stream 109 being greater than 30% solids by weight and/or (b) the second stream 111 being less than 3% solids by weight. For example, if the first stream 109 has a solids content less than 30% solids by weight, the amount of flocculant 110 added to the lime-tailings mixture 107 may be increased. Additionally, if the second stream 111 has a solids content greater than 3% solids by weight, the amount of flocculant 110 added to the lime-tailings mixture 107 may be increased.

The second stream 111 comprises water including solids levels at less than 3% and containing sodium hydroxide particles that have been formed as a byproduct of reacting the lime slurry 105 with bicarbonates from the tailings 103. As described in more detail below with respect to FIG. 2B, the second stream 111 can be directed toward and used to promote bitumen extraction. The first stream 109, corresponding to a mixture (e.g., a second mixture) having a second composition, is removed from a bottom portion of the vessel 108 and can be routed to further downstream processing or a disposal area (e.g., a pit or diked disposal area). In some embodiments, downstream processing can include drying (e.g., Tailings Reduction Operations (TRO), Atmospheric Fines Drying (AFD) or rim ditch), or routing to a disposal area (e.g., a diked disposal area) or reclamation area. The reclamation area may be, for example, water capped using Permanent Aquatic Storage Structure (PASS) technology.

The tailings 103 can include water, sand, clay, and residual bitumen particles that are suspended in the extraction water. The tailings 103 can be obtained from tailings ponds or steady-state extraction processes from oil sands or mining operations. The tailings 103 may be stored in a tailings pond and include a settled solids content of about 10-45% by weight (e.g., wet weight). More specifically, the tailings can include a mineral solids content from about 5-40%, a bitumen content from about 0-3%, a clay content from about 40-100%, and a pH from about 7.5-9.0. In some embodiments, the tailings 103 may undergo upstream processing (e.g., prior to being held in the holding reservoir 102), such as cyclone separation, screen filtering, thickening and/or dilution processes. The tailings 103 entering the mixer 106, after potentially being combined with recycled water 122, can be diluted to be as low as 3% solids by weight. In some embodiments, the solids content is preferably above 10% by weight.

The lime slurry 105 in the lime slurry holding reservoir 104 includes a liquid (e.g., water) and a lime additive that can be less than 15% by weight of the lime slurry, less than about 10% of the lime slurry, or less than about 5% of the lime slurry. The lime slurry additive 105 stored in the lime holding reservoir 104 can include inorganic materials that provide divalent (e.g., calcium) cations. As such, the lime slurry 105 can comprise a lime product including hydrated lime (e.g., calcium hydroxide ($Ca(OH)_2$)), slaked quicklime (e.g., calcium oxide (CaO)), and/or enhanced hydrated lime. The enhanced hydrated lime can include particles with an average Brunauer-Emmett-Teller (BET) surface area exceeding 30 $m^2$/g. Other specifications and characteristics of enhanced hydrated particles are described in U.S. patent application Ser. No. 15/922,179, filed Mar. 15, 2018, the disclosure of which is incorporated herein by reference in its entirety. In some embodiments, the lime slurry can include dolomitic lime (e.g., lime including at least 25% magnesium oxide on a non-volatile basis), other lime-containing materials, or a combination of quicklime, limestone, hydrated lime, enhanced hydrated lime, dolomitic lime, and/or other lime-containing materials. In the lime manufacturing process, limestone (e.g., calcium carbonate ($CaCO_3$)), is crushed to ¼" to 2" particles used as kiln feed. The kiln feed is then calcined, which converts the limestone particles into calcium oxide, which is sometimes referred to as quicklime. Introducing water to the quicklime leads to the formation of fine particles of hydrated lime, which is often referred to using the generic term "lime."

The tailings 103 and the lime slurry additive 105 are combined in the mixer 106 to produce the lime-tailings mixture 107 having the first composition. The mixer 106 can include means to agitate the lime-tailings mixture 107, such as rotating blades. In some embodiments, the mixer 106 can include a static mixer, a dynamic mixer, or a T mixer. The residence time in the mixer 108 for particles of the lime-tailings mixture 107 can be, for example, at least about five seconds, at least about 60 seconds, at least about five minutes, at least about 10 minutes, or at least about 20 minutes. In general, the mixer 106 mixes the tailings 103 and lime slurry 105 to ensure the lime-tailings mixture 107 exiting the mixer 106 is well mixed and has a desired pH at or slightly below about 12.0, 11.8 or 11.5. A pH at or below 12.0, for example, can aid in minimizing the bicarbonates present in the tailings 103. Additionally, a pH at or below 12.0 generally does not provide soluble calcium cations prior to the polymer 110 being added in a subsequent step. This minimizes the concentration of soluble calcium in the second stream 111. In some embodiments, the soluble calcium cations in stream 111 comprise about 100 mg/L, 90 mg/L, 80 mg/L, 70 mg/L, 60 mg/L, 50 mg/L, 40 mg/L, 30 mg/L, 20 mg/L, about 10 mg/L, or less. The pH of the lime-tailings mixture 107 at the outlet of the mixer 106 can be measured and used to control the pH of the lime-tailings mixture 107 by (a) increasing or decreasing the feed rate of the incoming lime slurry 105, and/or (b) increasing or decreasing the residence time of the tailings 103 and lime slurry 105 in the mixer 106.

The lime-tailings mixture 107 is directed to the second vessel 108 where it is combined with the flocculant 110. The flocculant can include one or more anionic, nonionic, cationic, or amphoteric polymers, or a combination thereof. These polymers can be naturally occurring (e.g., polysaccharides) or synthetic (e.g., polyacrylamides). In some embodiments, the flocculant 110 can be added as a part of a slurry, which may comprise about 0.4% by weight flocculant and process water and/or makeup water. Typically, at least one component of the flocculant 110 will be high molecular weight (e.g., up to about 50,000 kD). In some embodiments, the flocculant can promote thickening (e.g., increasing the concentration of solids) of the lime-tailings mixture 107 and allow solids from the lime-tailings mixture 107 to settle faster compared to if the lime-tailings mixture was treated only with a lime additive or only with a flocculant. The vessel 108 and the residence time of the lime-tailings mixture 107 in the vessel 108 can also promote thickening of the lime-tailings mixture 107 by aiding in the separation of the lime-tailings mixture 107 into the first stream 109 and the second stream 111. Stated otherwise, the vessel 108 decreases the amount of water that has to be removed by, for example, the dewatering device 116 to obtain a cake having acceptable geotechnical properties. As a result, removing the second stream 111 from the first stream 109 can decrease cycle time of the overall dewatering process.

The system 100 can further include a control system 130. As described in more detail below with reference to FIG. 2A, the control system 130 can be used to control operation associated with the system 100. Many embodiments of the control system 130 and/or technology described below may take the form of computer-executable instructions, including routines executed by a programmable computer. The control system 130 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "control system" as generally used herein refers to any data processor. Information handled by the control system 130 can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Figure 2A:
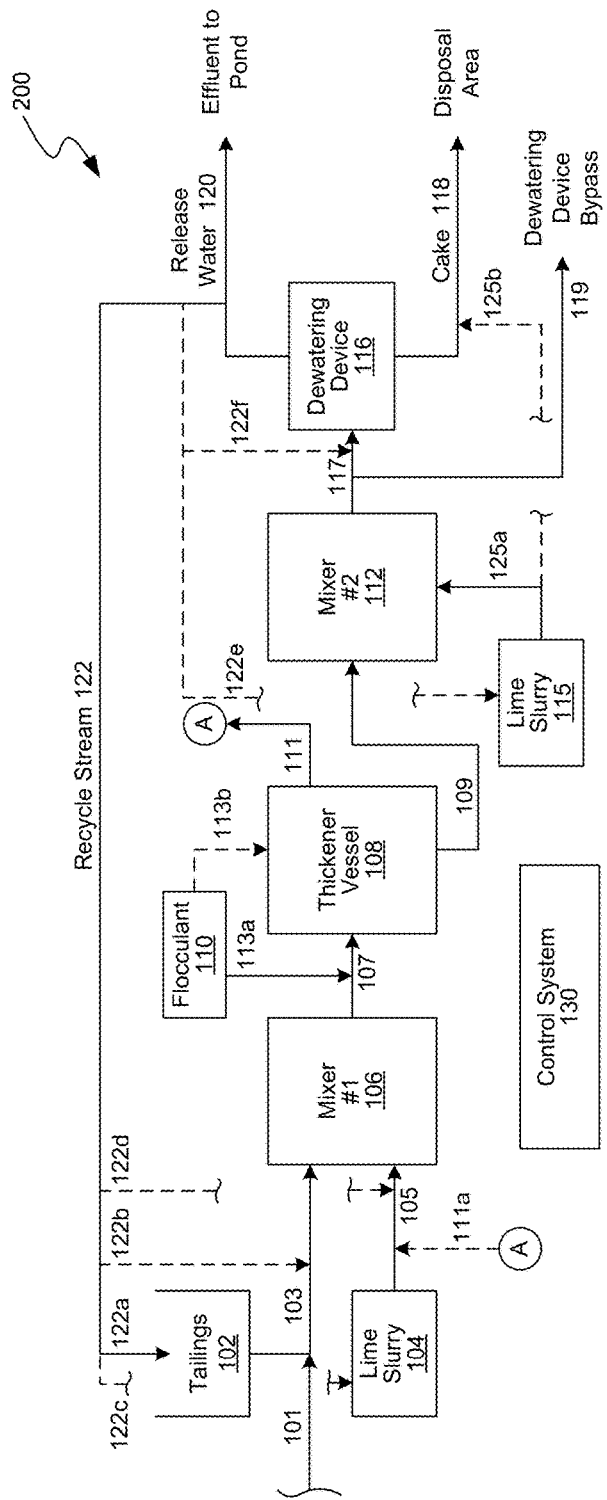
FIG. 2A is a schematic flow diagram of a tailings dewatering system, configured in accordance with embodiments of the present technology.
Figure 2B:
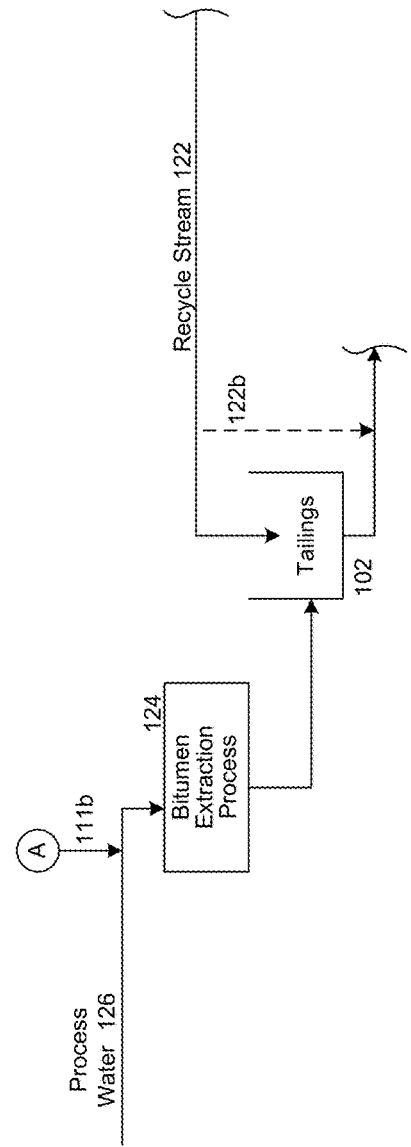
FIG. 2B is a schematic flow diagram of an extraction process of the tailings dewatering system, configured in accordance with an embodiment of the present technology.

In some embodiments, the second mixture 109 can undergo further treatment(s), including one or more additional dosages of lime and/or flocculants. FIG. 2A, which illustrates one such embodiment, includes a third vessel 112 (e.g., a second mixer) to which the second mixture 109 is routed to. As shown in the illustrated embodiment, the second mixture 109 is combined with a second dosage of lime slurry 115 in a third vessel 112, e.g., via line 125a, to produce a mixture 117 having a third composition and a pH greater than about 12.0, 12.2, or 12.4. The second dosage of lime slurry 115 can originate from the lime holding tank 104, a separate lime holding tank, or other means. As shown in the illustrated embodiment, the mixture 117 is then moved to a dewatering device 116 to promote dewatering of the mixture 117. As explained in further detail below, the dewatering device 116 can include a centrifuge, and/or a pressure, belt or vacuum filtration system that separates the mixture 117 into a first stream 118 substantially comprising solids (e.g., a "cake") and a second stream 120 substantially comprising a centrate or a filtrate (e.g., release water). The first stream 118 may be combined with a lime slurry, e.g., via line 125b. In some embodiments, the mixture 117 can be placed on one or more pads in thin/thick lifts to consolidate and dry the solids content contained therein.

As further shown in the illustrated embodiment, the second stream 120 can be directed to a pond and/or be used as a recycled stream 122. The recycled stream 122 can be combined with (a) the tailings reservoir 102, e.g., via line 122a, (b) the tailings 103, e.g., via line 122b, prior to being mixed with the first dosage of lime slurry 105, (c) the lime slurry reservoir 104, e.g., via line 122c, (d) the lime slurry 105, e.g., via line 122d, prior to being mixed with the tailings 103, (e) the lime slurry reservoir 115, e.g., via line 122e, (f) the mixture 117, e.g., via line 122f. The recycled portion of the release water can include soluble calcium cations previously injected as part of the lime slurry, and thus can decrease the amount of the first dosage of lime slurry 105 needing to be injected to the mixer 106. The second stream 118 can be collected and transported using a truck, belt, pump, and/or other conveying system(s) to an external site (e.g., a temporary storage or reclamation area).

As noted above, the second stream 111 can be directed toward and used to promote bitumen extraction. In the embodiment shown in FIG. 2B, the second stream 111 can be routed to an upstream process associated with extraction of bitumen from oil sands ore and be mixed with process water 126. In a conventional extraction process for oil sands operations, the process water 126 can be supplemented/treated with sodium particles ($Na^+$) to aid in releasing bitumen from the oil sands ore. Accordingly, one advantage of recycling the second stream 111 to treat the process water 126 is the ability to decrease any supplement addition of sodium particles. Additionally, since the second stream 111 is at least slightly alkaline due to the excess hydroxide ions present therein, recycling the second stream 111 to the extraction process can increase the pH of the oil sand ore and thereby improve bitumen extraction efficiency. Yet another advantage of recycling the second stream 111 is that heat is already present in the second stream 111, and thus recycling requires less downstream heating requirements compared to using just the process water 126. Yet another advantage of recycling the second stream 111 is removing the volume of the second stream 111 from the first stream 109 (i.e., the mixture having the second composition) that is sent downstream to the mixer 112 and the dewatering device 116. Removing the second stream 111 maximizes the solids content of the first stream 109 and minimizes the overall volume of material that is sent to the dewatering device 116. This decrease in volume can increase overall throughput of the dewatering system 100, and decrease time and costs associated with operating the dewatering device 116.

The lime-tailings mixture 109 having the second composition is subsequently directed from the vessel 108 to the mixer 112 where it is combined with the second dosage of lime 115. The lime slurry 115 used as the second dosage can include features generally similar or identical to the lime slurry 105 previously described and used as the first dosage. The mixer 112 and processing conditions (e.g., residence time) of the mixture 117 in the mixer 112 can include features generally similar or identical to the mixer 106 and processing conditions previously described. The second dosage of lime slurry 115 is added to the lime-tailings mixture to increase the pH of the mixture 117 exiting the mixer 112 to be above about 12.0. At this pH, pozzolanic reactions can begin to occur and thereby chemically modify clay particles from the tailings of the mixture 117.

An advantage of the addition of a first dosage of lime, a polymer, and a second dosage of lime, as opposed to only a single dosage of lime (e.g., lime slurry 105), is the decreased cycle time of the overall dewatering process. For example, the combination of the lime-tailings mixture 107 and the flocculant 110 in the vessel 108 without the significant presence of soluble calcium ions can result in a quicker settling of solids of the lime-tailing mixture 107 in the vessel 108. Additionally, since the second lime dosage 115 is combined with the mixture 109 after removing bicarbonate (e.g., via the second stream 111), the bicarbonate does not limit the effectiveness of the second lime dosage to promote pozzolanic reactions, as may be the case if only a single lime dosage was used.

The mixture 117 is subsequently directed (e.g., via gravity and/or a pump, from the mixer 112 to the dewatering device 116 or other treatment processes, e.g., via a dewatering device bypass 119. These other treatment processes can include, for example, thin/thick lift deposition, deep deposition, or water-capping technologies. As previously mentioned, the dewatering device 116 can include a centrifuge, a filtration system and/or other similar systems that can provide a physical force on the mixture 117 to promote dewatering and separate the mixture 117 into a centrate or a filtrate (e.g., the release water 120) and a cake 118. The centrifuge can include a scroll centrifugation unit, a solid bowl decanter centrifuge, screen bowl centrifuge, conical solid bowl centrifuge, cylindrical solid bowl centrifuge, a conical-cylindrical solid bowl centrifuge, or other centrifuges used or known in the relevant art. The filtration system can include a vacuum filtration system, a pressure filtration system, belt filter press, or other type of filtering apparatus known in the relevant art that utilizes a desired filtration process. In some embodiments, the filtration system can include a Whatman 50, 2.7 micron filter and can subject the lime-tailings mixture to about 100 psig of air pressure.

The mixture 117 may be transferred to the centrifuge or filter immediately after the mixing process has completed in the mixer 112, or after a period of time (e.g., a predetermined period of time). In some embodiments, the mixture 117 may, for example, be retained in the mixer 112 for one hour, 30 minutes, five minutes, or less. In other embodiments, the lime-tailings mixture may be retained for more than one hour (e.g., one day, one week, one month, etc.). In general, the mixture 117 may be retained for any desired amount of time to ensure it has been modified enough for the centrifuge and/or filter to separate a sufficient amount of water from the solids in the mixture 117. In some embodiments, the mixture 117 can bypass the dewatering device 116 via stream 119 and instead be directed toward, for example, a tailings pond or settling area to allow the mixture 117 to dewater over time without the use of additional machinery.

The dewatering device 116 has a first outlet used to transfer the separated release water 120, and a second outlet that is used to transfer the separated cake 118. The separated cake 118 is a solid (e.g., a soft solid) that is composed of the particulate matter found in the tailings, such as sand, silt, clay, and residual bitumen. The lime additive particles and some residual water typically do not get removed during the dewatering process. As previously mentioned, the cake 118 can include at least 45% solids by weight. In other embodiments, the cake 118 can include at least about 60% solids, at least about 65% solids, at least about 70% solids, at least about 80% solids, at least about 85% solids, or at least about 90% solids. More generally, the cake 118 may include a greater percentage of solids by weight than the percentage of liquids by weight.

The separated release water 120 can include water found in the tailings 102, water used to dilute the tailings 102 prior to the thickener 108, water added with the flocculants, and/or water that may be found in the lime slurry 104. The separated release water 120 may also contain some solid particulate matter (e.g., sand, silt, clay, residual bitumen, and lime additive) that is not separated from the release water 120 during the dewatering process. In some embodiments, the release water 120 includes less than about 10% solids by weight. In other embodiments, the release water can include less than about 5% solids, less than about 4% solids, less than about 3% solids, or less than 1% solids. In general, the release water 120 includes a significantly greater percentage of water by weight than the percentage of solids by weight.

The release water 120 may be directed to a number of different applications. For example, the release water 120 may be (a) recycled back to the tailings treatment process, or (b) used to regenerate caustic soda (e.g., sodium hydroxide) in water utilized in the bitumen extraction process. The release water 120 can be treated with carbon dioxide to reduce the pH and amount of soluble calcium cations present therein. This can be done via natural absorption of bicarbonates (e.g., by carbon dioxide present in the atmosphere), or by actively injecting carbon dioxide into the release water 120. In some embodiments wherein the release water 120 is recycled back to the tailings treatment process as the recycle stream 122, at least a portion of the release water 120 is recycled and added into the tailings holding reservoir 102 or the tailings stream 103 when being transferred to the mixer 106. The recycled release water 122 mixes with the tailings 103 prior to or while being combined with the first dosage of lime slurry 105. Adding the recycle stream 122 to the tailings stream 103 prior to the mixer 106 increases the pH level of the tailings 103 because the recycle stream 122 includes soluble calcium cations that were not removed during the dewatering process, and is thus alkaline. As will be discussed in greater detail below, the calcium ions in the recycle stream 122 readily react with bicarbonates present in the tailings stream 103 to form insoluble compounds that precipitate out of solution and can separate from the suspended tailings. Using the recycle water 122 to reduce the amount of bicarbonates in the tailings 103 reduces the amount of the lime slurry 105 needed for enhanced dewatering to occur, which in turn can reduce the cost of the overall dewatering process. In some embodiments, using recycle water 120 to increase the pH level of the tailings 103 can be omitted and the tailings dewatering system 100 may not use any portion of the release water 120 during the dewatering process.

The system 200 can include the control system 130, as previously described. The control system 130 can be used to control operation of the system 200. For example, the control system 130 can control (e.g., regulate, limit and/or prevent) the flow of fluids (e.g., process 101, tailings stream 103, lime slurry 105, lime-tailings mixtures 107/109/117, second stream 111, cake 118, dewatering device bypass 119, release water 120, recycle stream 122, etc.) to and/or from different units (e.g., tailings reservoir 102, lime holding tank 104, mixers 106/112, vessel 108, dewatering device 116, etc.) of the system 200. Additionally, the control system 130 can control operation of individual units, such as the mixers 106/112 (e.g., controlling mixing speeds), and/or the dewatering device 116.

Figure 3:
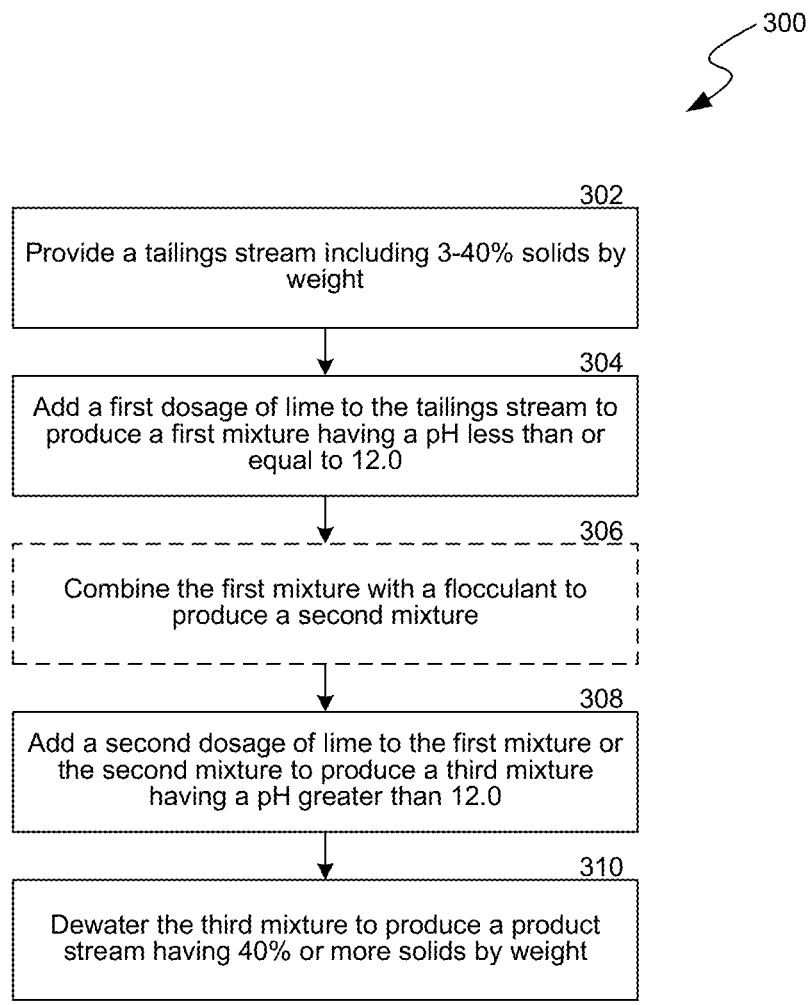
FIG. 3 is a block diagram of a method of dewatering a tailings stream, configured in accordance with an embodiment of the present technology.

FIG. 3 is a block diagram of a method 300 of dewatering a tailings stream, configured in accordance with an embodiment of the present technology. Process portion 302 includes providing a tailings stream including 3-40% solids by weight to a dewatering system (e.g., the systems 100 or 200). The tailings stream can have a composition similar or identical to the tailings stream 103 previously described. The tailings stream may operate as a steady state system having a constant feed or as a batch stream in which tailings are provided to the system at regular intervals.

Process portion 304 includes combining the tailings stream with a dosage of lime, such as quicklime, limestone, hydrated lime, enhanced hydrated lime, or dolomitic lime, to the tailings stream to form a first mixture. Adding the dosage of lime to the tailings stream increases the pH of the tailings stream to or slightly below 12.0 such that bicarbonates present in the tailings stream begin to react with and be consumed by calcium cations from the dosage of lime. Notably, at a pH below 12.0, cation exchange can occur, but pozzolanic reactions do not readily occur because the amount of soluble $Ca^{2+}$ cations in the lime-tailings mixture and available to react with clay materials (e.g., Kaolinite ($Al_2Si_2O_5(OH)_4$)) typically found in tailings streams is limited to less than 30 mg/L (e.g., about 25 mg/L, 20 mg/L, 15 mg/L, 10 mg/L). Calcium cations from lime additives are consumed by reactions with bicarbonates at lower pH. This is different than other calcium cations found in gypsum and calcium chloride that have partially soluble calcium cations at lower pH. For example, when sodium bicarbonate is exposed to calcium hydroxide, calcium cations bond with carbonate ions and sodium bicarbonate is converted to sodium carbonate ($Na_2CO_3$), as seen in Reaction 1:

$$Ca(OH)_2 + 2NaHCO_3 \rightarrow CaCO_3 + Na_2CO_3 + 2H_2O \quad \text{(Reaction 1)}$$

The calcium hydroxide will also readily react with the sodium carbonate formed during Reaction 1 to form additional calcium carbonate and sodium hydroxide (NaOH), as seen in Reaction 2:

$$Ca(OH)_2 + 2Na_2CO_3 \rightarrow CaCO_3 + 2NaOH \quad \text{(Reaction 2)}$$

The calcium carbonate formed during Reactions 1 and 2 will precipitate out of solution into solid particulate matter. Potassium and calcium bicarbonate will undergo similar reactions with calcium hydroxide. In addition to the bicarbonates found in the tailings, atmospheric carbon dioxide ($CO_2$) will dissolve in water that has an alkaline pH level to form carbonic acid ($H_2CO_3$), which reacts with calcium hydroxide to form calcium carbonate and water, as shown in Reactions 3 and 4:

$$CO_2 + H_2O \rightarrow H_2CO_3 \quad \text{(Reaction 3)}$$

$$Ca(OH)_2 + H_2CO_3 \rightarrow CaCO_3 + 2H_2O \quad \text{(Reaction 4)}$$

While Reactions 3 and 4 reduce the amount of soluble calcium cations available for cation exchange and pozzolanic reactions to occur, the concentration of carbon dioxide in the atmosphere is relatively low and limited by diffusion from the atmosphere into water. As such, Reactions 3 and 4 require longer periods of time to have an effect on the concentration of free calcium cations in the lime-tailings mixture under atmospheric conditions. Reactions 1 and 2, on the other hand, are limited only by the availability of carbonate ions in the lime-tailings mixture and occur significantly more readily than cation exchange or pozzolanic reactions, which means that there are very few free calcium cations available to react with clays in the tailings until the carbonate ions are largely depleted. However, as the amount of lime additive added to the lime-tailings mixture increases, the pH level of the mixture will eventually approach about 12.0, or more particularly about 11.8, and the concentration of carbonate ions in the mixture will approach zero. At this point, the number of free and soluble calcium cations in the water will increase.

In process portion 306, the first mixture can optionally be combined with a flocculant. The combination of the first mixture with the flocculant can separate into a first stream (e.g., first stream 109) comprising a second mixture, and a second stream (e.g., second stream 111) significantly comprising water having sodium hydroxide particles. The sodium hydroxide particles in the second stream are produced in part from Reaction 2 and can be removed from the dewatering process such that only the second mixture continues toward the dewatering device.

In process portion 308, a second dosage of lime can be combined with the first mixture or the second mixture to produce a third mixture having a pH greater than about 12.0 (process portion 408). Specifically, the calcium hydroxide ions provided via the second lime dosage increase the pH of the third mixture and provide divalent cations that can modify and affect the stability of fine clay soils in the tailings. As the pH increases above 11.5, the calcium cations from lime are more soluble due to the depletion of bicarbonates in process water and can replace cations such as sodium and potassium on the surface of clay soils. As pH levels increase above 12.0, a chemical modification of the clay's surface occurs by pozzolanic reactions. In pozzolanic reactions, soluble calcium cations from the lime react with silicic acid ($Si(OH)_4$) and aluminate ($Al(OH)_4^-$) functional groups from the clay materials to form calcium silicate hydrate ($CaH_2SiO_4 \cdot 2H_2O$) and various aluminum hydrates, such as calcium aluminate hydrate. After being chemically modified, the fine clay particles grow in size, decrease their water layer, and can be separated from the water using a centrifuge or filter, as previously described. In some embodiments, the pozzolanic reactions may occur after the third mixture is centrifuged and/or filtered.

As the pH level of the mixture increases above 11.0, settling of the solid particulate matter in the second mixture also increases. However, the dewatering rate of the second mixture is still limited at that pH. Once the pH level of the mixture reaches a pH level greater than 12.0 (e.g., about 12.3 in some cases), pozzolanic reactions between the dissolved calcium cations and the clay particulate matter begin to occur. As such, the second dosage of lime is used to increase the pH level of the mixture above 12.0.

In systems where the tailings stream is provided as a continuous flow of oil sands tailings, the lime additive may be a continuous flow of lime additive that is continuously added and mixed into the tailings stream. In systems where the tailings stream is provided as batches, the lime additive may be added and mixed into the tailings streams in individual batches.

After the third mixture has been thoroughly mixed, e.g., in the mixer 112, the method proceeds to process portion 310, where the third mixture is dewatered by separating at least a portion of the solid material from the liquid components in the third mixture. As previously described, the dewatering process can comprise a centrifuge and/or filter to forcibly separate the solid material in the third mixture from the liquid components. Specifically, the centrifuge and/or filtration system provide a driving force that promotes dewatering the clay particles via cation exchange and pozzolanic reactions, as previously described. In other embodiments, the third mixture is dewatered in a dedicated disposal area by a process, such as thin/thick lift deposition, TRO, AFD, and/or PASS, where atmospheric drying and freeze/ thaw treatment(s) to allow the third mixture to dewater over time without the use of additional machinery.

After dewatering, the method 300 proceeds to produce a cake with a solids content of at least 40% solids by weight. The solids in the cake are typically sand, silt, clay, residual bitumen, and the lime additive, along with any other solid particulate matter that is present in either the tailings and/or first and second dosages of lime. The balance of the cake is composed primarily of water that was introduced in either the tailings and/or first and second dosages of lime. As previously described, the dewatering system also produces a release water stream that is formed from the tailings water from which the solids are separated. Converting the solid material found in the oils sands tailings stream into a stream of cake that is at least 55% solids by weight enables significantly easier storage, transport and disposal of the solids compared to the solid materials trapped in suspension in the oil sands tailings stream.

Figure 4:
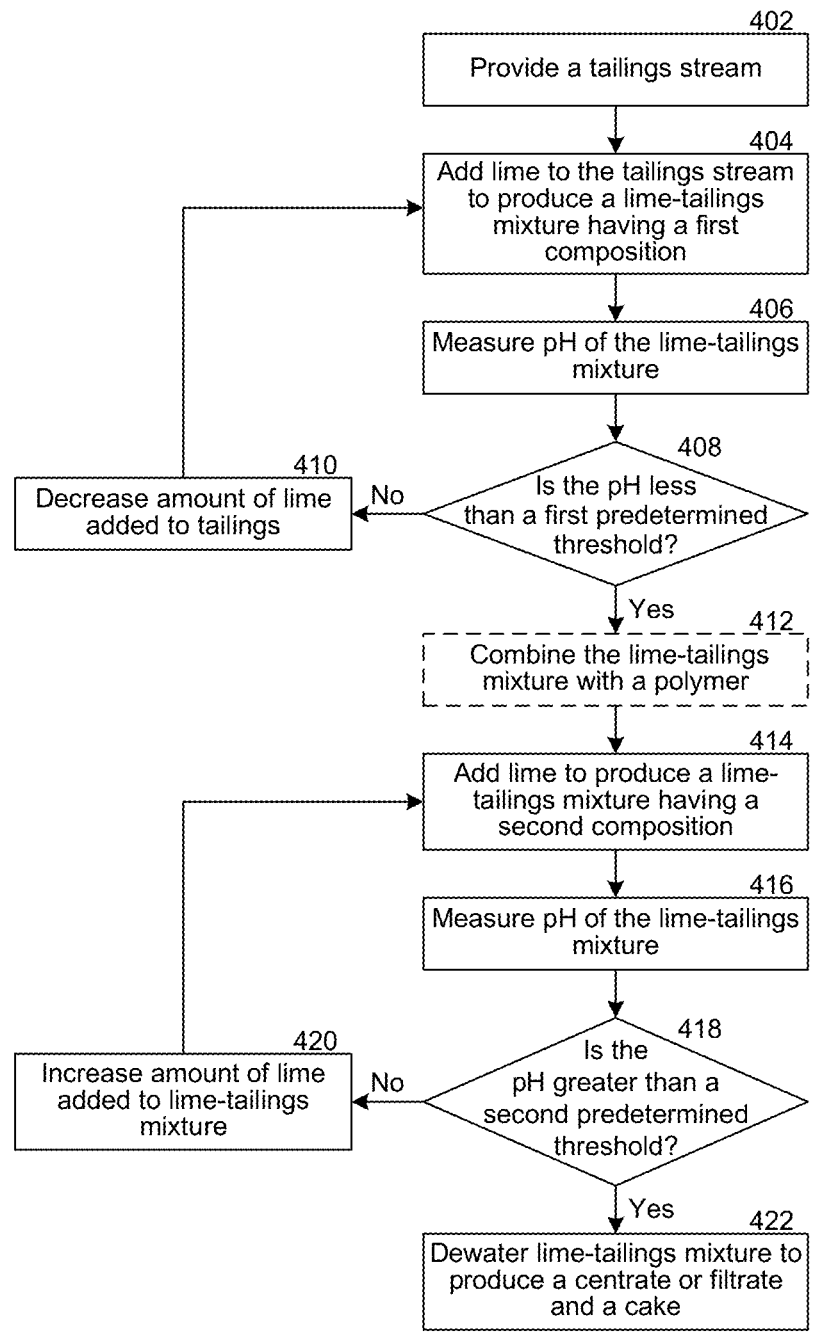
FIG. 4 depicts a flow chart 400 for dewatering a tailings stream, configured in accordance with an embodiment of the present technology.

FIG. 4 depicts a flow chart 400 for dewatering a tailings stream, configured in accordance with an embodiment of the present technology. As shown in the illustrated embodiment, the flow chart 400 includes providing a tailings stream (block 402), and adding lime to the tailings stream to produce a lime-tailings mixture having a first composition (block 404). The pH of the lime-tailings mixture having the first composition is then measured (block 406). Depending on whether the measured pH is less than a first predetermined threshold (block 408), the system (e.g., the control system 130) may decrease the amount of lime being added to the tailings stream in block 404 (block 410). In some embodiments, the first predetermined threshold may be a pH less than or equal to about 12.0, 11.8. or 11.5. As previously described, a pH at or below 12.0, for example, can aid in minimizing the bicarbonates present in the tailings 103, which can affect the rate of dewatering in the downstream process. If the measured pH is less than the first predetermined threshold, then the system may proceed without adjusting the amount of lime being added to the tailings stream in block 404.

The flow chart 400 further includes an optional step of combining the lime-tailings mixture with a polymer. As previously described, in some embodiments, the polymer can promote thickening of the lime-tailings mixture and allow solids from the lime-tailings mixture to settle faster compared to if the lime-tailings mixture was treated only with lime or only with a polymer.

As shown in the illustrated embodiment, additional lime is added to produce a lime-tailings mixture having a second composition different than the first composition (block 414), and the pH of the lime-tailings mixture having the second composition is then measured (block 416). Depending on whether the measured pH is greater than a second predetermined threshold (block 418), the system may increase the amount of lime being added to the lime-tailings mixture in block 414 (block 420). In some embodiments, the second predetermined threshold may be a pH greater than or equal to about 12.0, 12.2 or 12.4. As previously described, a pH at or above 12.0, for example, can promote pozzolanic reactions, which can chemically modify clay particles of the lime-tailings mixture and thereby stimulate dewatering of the lime-tailings mixture. If the measured pH is greater than the second predetermined threshold, then the system may proceed without adjusting the amount of lime being added to the lime-tailings mixture in block 414. After determining whether the pH is greater than the second predetermined threshold, the lime-tailings mixture having the second composition can be dewatered to produce a centrate (e.g., via centrifugation) or a filtrate (e.g., via pressure filtration), and a cake (block 422). Each of the centrate, filtrate and cake can undergo further processing, as previously described with reference to FIG. 2A.

Example 1—Treatment of FFT with and without Lime Coagulation

Figure 5C:
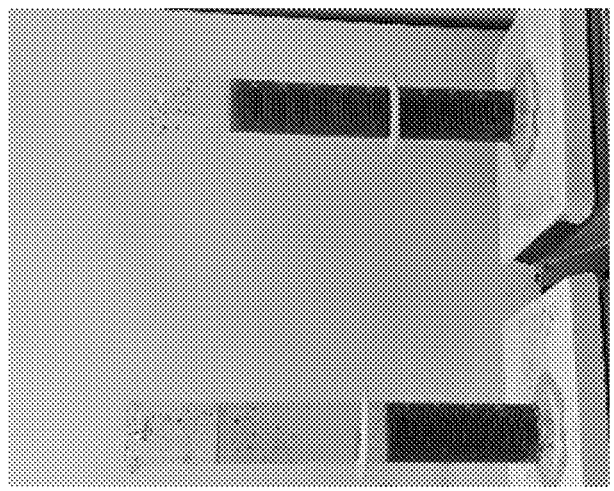
FIGS. 5A-5C are images of experimental results related to treatment of tailings stream samples with and without lime over a period of time, configured in accordance with embodiments of the present technology.
Figure 5B:
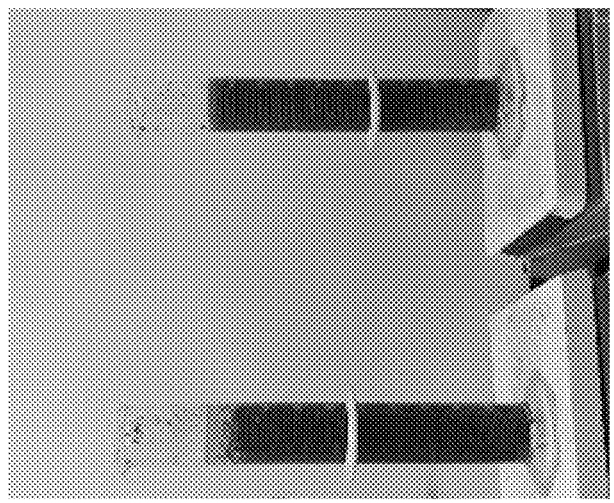
Figure 5A:
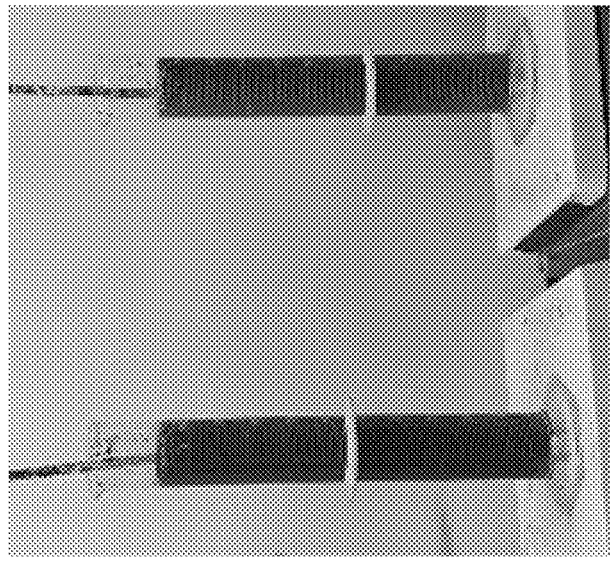

FIGS. 5A-5C are images of experimental results related to treatment of tailings stream samples with and without lime over a period of time, in accordance with embodiments of the present technology. More specifically, a comparison test was run to examine the difference between treating an FFT sample with and without lime coagulation. Each of the two FFT samples was diluted with process water to approximately 3% solids by weight. The sample on the left side of FIGS. 5A, 5B and 5C was coagulated with 1000 mg/kg hydrated lime and flocculated with SNF A3331 polymer at a dose of 250 g/dry tonne FFT solids. The sample on the right side of FIGS. 5A, 5B and 5C was treated only with SNF A3331 polymer at a dose of 250 g/tonne FFT solids. Both sample conditions were simultaneously mixed multiple times by lowering a glass rod with a rubber stopper on the bottom through the mixture.

FIG. 5A shows the two samples during the final mixing, FIG. 5B shows the two samples a period of time (less than one minute) after the image of FIG. 5A was taken, and FIG. 5C shows the two samples a period of time (less than one minute) after the image of FIG. 5B was taken. As shown in FIGS. 5B and 5C, the lime treated sample settled into a first (bottom) portion including ultra-fine particles of the FFT, and a second (top) portion including release water of the FFT. Notably, the sample treated only with polymer does not exhibit the same settling rate, as FIG. 5C shows the FFT only slightly settled. Example 1 illustrates in part that lime coagulation with polymer flocculation, as opposed to just polymer flocculation, can improve fines capture of FFT samples.

Example 2—Treatment of FFT with Lime Coagulation Prior to Flocculant Addition

An experimental study was performed to examine the impact on settling rate of an FFT sample treated with lime prior to being treated with a flocculant. The FFT samples were diluted to 3% solids by weight, and varying concentrations of lime were added as a well homogenized slurry to the FFT samples. As shown in Table 1 below, the lime concentrations included 0 mg/kg, 750 mg/kg, 900 mg/kg, 1000 mg/kg and 1250 mg/kg. The lime slurry comprised a hydrated lime concentration of 5% solids by mass with distilled water. After the slurry was added to the FFT sample, the lime was mixed into the 3% solids FFT sample using a submerged plunger. Subsequently, a 0.5 g/L solution of A3331 polymer was added to the mixture to attain 250 g/dry ton solids polymer dosage, and the system was again mixed. The total volume of material in the cylinder was approximately 1 L. The time (in seconds) needed for the interface (referred to as "the mudline") between the release water and the settled solids of the mixture to reach 700 mL (70% of total height) was recovered to account for the rate of initial settling, and the mudline (in mL) was recorded after 30 minutes to attain the total capacity of settling that had occurred.

Figure 6:
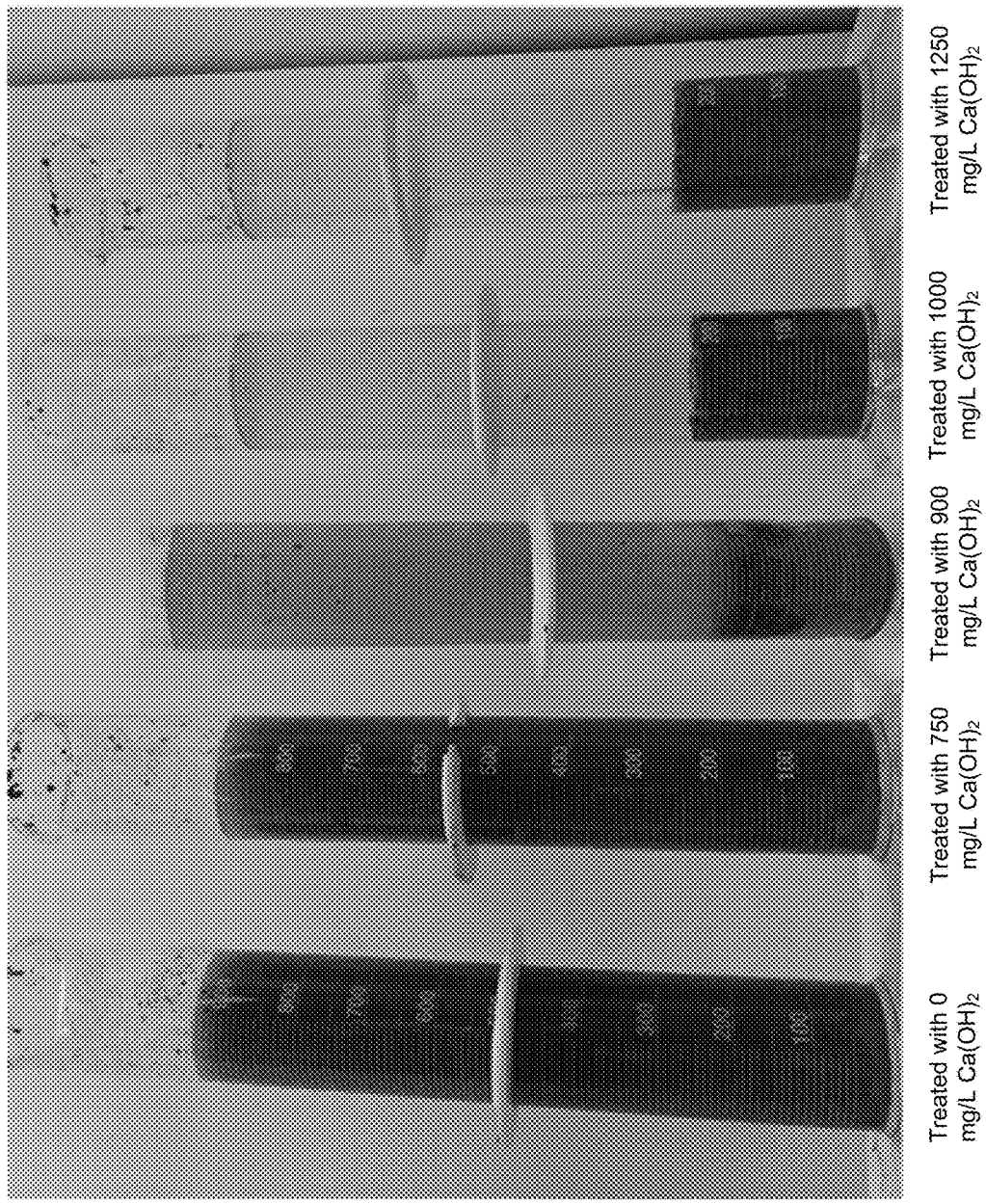
FIG. 6 is an image of experimental results related to treatment of tailings stream samples using various concentrations of lime, in accordance with embodiments of the present technology.

FIG. 6 is an image of the experimental results obtained in relation to Example 2. As shown in the FIG. 6, the clarity of the release water is directly correlated to the dosage of lime concentration. The improved clarity of the release water is an indication of reduced turbidity of the release water.

Table 1 shows results of Example 2 related to the settling time and the mudline. The results in Table 1 indicate that as the concentration of lime addition was increased, (a) the settling time generally decreased and (b) the amount of settled solids, as indicated by the mudline, generally increased. Accordingly, the experimental results of Example 2 indicate that the amount of lime additive directly correlates to settling rate of the lime-FFT mixture.

TABLE 1

| Hydrate lime addition mg/kg | Time to settle to 70% of total height s | Mudline at 30 min mL |
|---|---|---|
| 0 | NA | 155 |
| 750 | 8 | 190 |
| 900 | 5 | 245 |
| 1000 | 3 | 245 |
| 1250 | 4 | 275 |

Table 2 shows an analysis of the release water from Example 2. The results in Table 2 show that dissolved ion concentration varied for different concentrations of lime concentration addition. For example, calcium concentration of the lime treated FFT mixture initially dropped at the 750 mg/kg lime concentration, but increased at higher lime dosages and rose above the initial FFT calcium concentration once the pH exceeded 11.7.

Table 2 also shows an immediate reduction in the magnesium content, as magnesium concentration decreased from 12 mg/L to 1 mg/L at pHs above 10. Without being bound by theory, this is likely because a pH above 10 causes the magnesium to precipitate as $Mg(OH)_2$, and is no longer soluble in the release water.

Table 2 also shows that carbonate alkalinity is indirectly correlated with lime concentration addition. The initial alkalinity content of 882 mg $CaCO_3$/L at the 0 mg/kg lime dosage decreases drastically to 118 $CaCO_3$/L at the 750 mg/kg lime dosage, and then more gradually to 28 $CaCO_3$/L at the 1250 mg/kg lime dosage. Without being bound by theory, the removal of carbonate alkalinity involves a first reaction which converts bicarbonates to carbonates by raising the pH from the hydrated lime addition, and a second reaction which reacts soluble calcium (from the initial process water or hydrated lime) with carbonate to precipitate calcium carbonate. The calcium carbonate then sequesters the calcium as an insoluble solid.

enhanced capture of the clay particles of the FFT during flocculation. The calcium particles of the lime react with the FFT to neutralize the anionic charges on the surface of the clays, which in turn coagulates the particles and improves flocculant performance. This is evident by the definitive mud line shown in FIG. 6 and captured in Table 1 above.

Furthermore, as shown in Table 2, there appears to be an ideal lime dosage that provides the quickest initial settling rate of the flocculated FFT. For example, as shown in Table 2, the ideal lime dosage generally occurs after the carbonate alkalinity is substantially eliminated, but before soluble calcium concentrations rise to 90 mg/L. This ideal lime dosage resulting in increased fines capture is represented by the slightly higher mudlines observed in FIG. 6 and shown in Table 1. The slightly higher mudlines likely result because the solid bed in the lime treated FFT contains all of the solids treated in the experiment, whereas the solid bed from polymer only treatment may not include the fine clays suspended in the release water.

Example 3—Impact of Lime on Cake Consolidation Time and Final Cake Solids

Bench scale pressure filtration tests were run to determine the impact of hydrated lime addition on the cake consolidation time and final cake solids of FFT. Five trials were conducted, including three trials without polymer addition (i.e., Trials 1, 2 and 3) and two trials with polymer addition (i.e., Trials 5 and 6). As seen in Trials 1, 2 and 3, as the dose of hydrated lime increased, the cake consolidation time decreased and the cake solids content increased. FFT was treated by adding 5% hydrated lime slurry to undiluted FFT with solids contents measured between 32.5 to 35.2%.

Trials 4 and 5 were conducted to examine the impact of increasing the percent solids of the pressure filter feed. The FFT samples were diluted to 3% solids to simulate thickener feed. Trial 4 utilized A3331 polymer (175 g/tonne) to flocculate the FFT and increase the underflow solids to 40%. Trial 5 utilized approximately 2,000 mg/kg of hydrated lime, which was added prior to the A3331 polymer addition. The remaining hydrated lime of 2,000 mg/kg, which was required to achieve a pH over 12, was added to the 40% solids thickened underflow.

As shown in Table 3 below, results of Example 3 show that despite higher percent solids for the feed to the pressure filter in Trial 4, thickening only with polymer increased the cycle time and decreased the pressure filter cake solids level.

TABLE 2

| Hydrated Lime Addition mg/kg | Dissolved Ion Concentration | | | | | | | | Carbonate Alkalinity mg $CaCO_3$/L | PH |
|---|---|---|---|---|---|---|---|---|---|---|
| | $Ca^{2+}$ mg/L | $Na^+$ mg/L | $K^+$ mg/L | $Mg^{2+}$ mg/L | $Al^{3+}$ mg/L | $Cl^-$ mg/L | $SO_4^{2-}$ mg/L | $HCO_3^-$ mg/L | | |
| 0 | 31 | 263 | 7 | 12 | 1 | 90 | 99 | 498 | 882 | 9.1 |
| 750 | 11 | 232 | 4 | 1 | 1 | 90 | 79 | 6 | 118 | 11.4 |
| 900 | 16 | 261 | 8 | 1 | 2 | 89 | 81 | 1 | 38 | 11.6 |
| 1000 | 31 | 246 | 7 | 1 | 0 | 90 | 97 | 1 | 30 | 11.7 |
| 1250 | 93 | 279 | 8 | 1 | 1 | 90 | 79 | 1 | 28 | 11.8 |

Generally speaking, the addition of lime in elevated concentrations provides benefits to the settling properties of the FFT solids. The lime causes significant decreases in turbidity of the release water, which is an indication of Furthermore, as shown in Trial 5, adding hydrated lime both before and after the polymer addition resulted in the best cake consolidation time of 40 minutes, and final cake solids content of 72.0%.

TABLE 3

|  | No Polymer Added ||| Thickened Tailings ||
|---|---|---|---|---|---|
| Parameter | 1 | 2 | 3 | 4 | 5 |
| Feed Solids Concentration (wt %) | 35.2 | 34.1 | 32.5 | 40.0 | 40.0 |
| Lime Dose (mg/kg) | 2000 | 4000 | 7000 | 0 | 2000/2000 |
| Chamber Thickness (mm) | 25.0 | 25.0 | 25.0 | 25.0 | 25.0 |
| Cake Consolidation Time (min) | 65.0 | 59.0 | 50.0 | 85.0 | 40.0 |
| Final Cake Solids (%) | 63.6 | 71.2 | 73.5 | 65.8 | 72.0 |

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. The term "about," as used throughout this application, is meant to indicate a range of +/−10% of the indicated value. Additionally, the terms "comprising" and the like are used throughout this disclosure to mean including at least the recited feature(s) such that any greater number of the same feature(s) and/or one or more additional types of features are not precluded. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

From the foregoing, it will be appreciated that specific embodiments of the invention have been described herein for purposes of illustration, but that various modifications may be made without deviating from the scope of the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

Examples of the Present Technology

The subject technology is illustrated, for example, according to various examples described below. Various examples of the subject technology are described as numbered clauses (1, 2, 3, etc.) for convenience. These are provided as examples and do not limit the subject technology. It is noted that any of the dependent clauses may be combined in any combination, and placed into a respective independent clause (e.g., clause 1, 22, 25, etc.). The other clauses can be presented in a similar manner.

1. A method for treating a tailings stream, the method comprising:
    adding a first dosage of lime additive to a tailings stream to produce a first mixture having a pH less than about 12.0 and a soluble calcium level less than about 100 mg/L;
    after adding the first dosage, adding a second dosage of lime additive to the first mixture to produce a second mixture having a pH greater than about 12.0; and
    dewatering the second mixture to produce a cake including at least 40% solids by total weight.

2. The clause of claim 1, further comprising:
    directing the first mixture to a thickener vessel; and
    separating the first mixture into a first stream comprising water and a second stream,
    wherein adding the second dosage to the first mixture includes adding the second dosage to the second stream.

3. The clause of claim 2, further comprising directing the first stream to be mixed with the first dosage prior to adding the first dosage to the tailings stream.

4. The clause of claim 2 wherein the first stream has a soluble calcium level within a range from about 10 mg/L to about 30 mg/L.

5. The clause of claim 1, further comprising adding a flocculant slurry containing one or more polymers to the first mixture prior to adding the second dosage, wherein the first mixture having the added flocculant slurry includes a solids content exceeding 30% by wet weight.

6. The clause of claim 5 wherein the first dosage and the tailings are combined in a first mixer, the flocculant slurry is added to the first mixture in or before a thickener vessel, and the second dosage is added to the second mixture in a second mixer downstream of the thickener vessel.

7. The clause of claim 1 wherein the cake comprises a first stream, and wherein dewatering includes filtering or centrifuging the second mixture to produce the first stream and a second stream, the second stream comprising release water having soluble calcium ions.

8. The clause of claim 7 wherein the tailings stream includes bicarbonates, the method further comprising:
    recycling at least a portion of the second stream to be mixed with the tailings stream prior to the addition of the first dosage, wherein recycling the second stream increases the pH of the tailings stream and reduces the bicarbonates of the tailings stream.

9. The clause of claim 8, further comprising:
    after recycling the second stream, decreasing the amount of the first or second dosages as a result of the second stream increasing the pH of the tailings stream.

10. The clause of claim 8 wherein recycling the second stream is based at least in part on a measured soluble calcium level of the second stream.

11. The clause of claim 8 wherein the recycled second stream is added to the first dosage prior to the first dosage being added to the tailings.

12. The clause of claim 1 wherein at least one of the first or second dosages are part of a lime slurry including hydrated lime, wherein the hydrated lime includes particles having an average surface area greater than or equal to about 30 $m^2$/g.

13. The clause of claim 1 wherein at least one of the first or second dosages includes a lime slurry comprising less than 15% lime by total weight.

14. The clause of claim 1, further comprising:
    forming a flocculant slurry by combining one or more polymers with at least one of process water or makeup water; and
    adding the flocculant slurry to the first mixture prior to adding the second dosage.

15. The clause of claim 1 wherein the first mixture has a pH less than about 11.5 and the second mixture has a pH greater than about 12.4.

16. The clause of claim 1 wherein the amount of the second dosage added is based at least in part on a pH of the second mixture.

17. The clause of claim 1 wherein the cake comprises a thickened tailings stream, the method further comprising:
   directing the thickened tailings stream to at least one of a deposition process or a water-capped cell.

18. The clause of claim 1 wherein the second mixture includes silicic acid or aluminate, and wherein dewatering the second mixture includes reacting the lime of the second dosage with the silicic acid or aluminate.

19. The clause of claim 1 wherein the first mixture includes a soluble calcium level less than 50 mg/L.

20. The clause of claim 1 wherein the tailings stream includes bicarbonates, and wherein adding the first dosage of lime comprises reducing the bicarbonates in the tailings stream to be below about 20 mg/L.

21. The clause of claim 1 wherein the first mixture includes alkalinity, and wherein adding the first dosage comprises reducing the alkalinity of the first mixture to be below about 130 mg/L of calcium carbonate equivalent.

22. A system for treating tailings streams for oil sands or mining operations, the system comprising:
   a tailings reservoir including tailings having about 3-40% solids by total weight;
   a first mixer positioned to receive a first lime slurry and the tailings from the tailings reservoir;
   a second mixer downstream of the first mixer and in fluid communication with the first mixer;
   a dewatering device downstream of and in fluid communication with the second mixer, the dewatering device comprising at least one of a centrifuge or filter; and
   a computer-readable medium having instructions that, when executed, cause the system to—
      add the first lime slurry to the tailings in or before the first mixer to produce a first mixture in the first mixer, wherein adding the first lime slurry is based at least in part on a pH of the first mixture being less than about 12.0;
      add the second lime slurry to the tailings in or before the second mixer to produce a second mixture in the second mixer, wherein adding the second lime slurry is based at least in part of a pH of the second mixture being greater than about 12.0; and
      operate the dewatering device to produce a centrate or filtrate comprising water and a cake comprising at least 40% solids by total weight.

23. The clause of claim 22, further comprising a thickener vessel between the first and second mixers, the instructions, when executed, further cause the system to add a flocculant slurry comprising a polymer.

24. The clause of claim 22, further comprising a recycle stream in fluid communication with the centrate or filtrate, wherein the instructions, when executed, further cause the system to direct, via the recycle stream, at least a portion of the centrate or filtrate to be mixed with the tailings, the first lime slurry and/or the second lime slurry.

25. A method for treating tailings streams, the method comprising:
   adding a first dosage of lime additive to a tailings stream to produce a first mixture, the first mixture having a pH less than about 12.0 and a soluble calcium level less than 100 mg/L;
   combining the first mixture with a flocculant slurry comprising one or more polymers;
   separating the combined first mixture and flocculant slurry into a first stream and a second stream; and
   adding a second dosage of lime additive to the second stream to produce a second mixture having a pH greater than about 12.0.

26. The clause of claim 25, further comprising dewatering the second mixture to produce a centrate or filtrate comprising water and a cake including at least 40% solids by total weight, the method further comprising recycling at least a portion of the centrate or filtrate to be mixed with at least one of the first dosage, the tailings stream or the second dosage.

27. The clause of claim 25 wherein the first mixture has a pH less than 11.5 and the second mixture has a pH greater than 12.4.

28. The clause of claim 25, further comprising measuring a pH of the first mixture, wherein adding the first dosage to the tailings stream is based at least in part on the measured pH of the first mixture.

29. The clause of claim 28, further comprising measuring a pH of the second mixture, wherein adding the second dosage to the second mixture is based at least in part on the measured pH of the second mixture.

30. The clause of claim 25 wherein the tailings includes a first conductivity and the first stream includes a second conductivity less than the first conductivity.

31. The clause of claim 25 wherein the tailings includes a first total dissolved solids content and the first mixture includes a second total dissolved solids content less than the first total dissolved solids content.

32. The clause of claim 25 wherein the first mixture includes a magnesium content less than 20 mg/L.

33. The clause of claim 25 wherein the first stream comprises water and the second stream comprises thickened tailings, the method further comprising:
   adding process water to the tailings stream; and
   recycling at least a portion of the first stream to be mixed with the process water prior to adding the process water to the tailings stream.

Additional features and advantages of the subject technology are described below, and in part will be apparent from the description, or may be learned by practice of the subject technology. The advantages of the subject technology will be realized and attained by the structure particularly pointed out in the written description and claims hereof as well as the appended drawings.

We claim:

1. A method for treating tailings, the method comprising:
   obtaining oil sands tailings comprising clay;
   combining a flocculant comprising a polymer with a first mixture comprising the tailings;
   after combining the flocculant, combining a dosage of lime with the first mixture to produce a second mixture having a pH greater than 11.8, soluble calcium cations, and a calcium concentration of at least about 93 mg/L, such that the clay of the tailings in the second mixture is chemically modified via pozzolanic reactions with the calcium cations.

2. The method of claim 1, wherein:
   the flocculant comprises a flocculant slurry including the polymer and at least one of process water or makeup water,
   the flocculant slurry is combined with the first mixture in or prior to a thickener vessel, and
   the dosage of lime is combined with the first mixture downstream of the thickener vessel.

3. The method of claim 1, wherein the polymer comprises an anionic polymer.

4. The method of claim 1, wherein the polymer comprises a nonionic, cationic, or amphoteric polymer.

5. The method of claim 1, wherein the polymer comprises a polyacrylamide.

6. The method of claim 1, further comprising, before combining the dosage of lime, separating the first mixture into a first stream comprising water and a second stream comprising a pH of at least 9.0, wherein combining the dosage of lime comprises combining the dosage of lime with the second stream.

7. The method of claim 1, wherein combining the dosage of lime comprises combining a second dosage of lime, the method further comprising, prior to combining the flocculant, combining a first dosage of lime with the tailings to form the first mixture.

8. The method of claim 1, further comprising, dewatering the second mixture to produce a product having at least 40% solids by total weight.

9. The method of claim 8, further comprising pumping the dewatered second mixture to a reclamation area.

10. The method of claim 1, further comprising pumping the second mixture to a pond or reclamation area.

11. A method for treating tailings from oil sands, the method comprising:
   combining a flocculant comprising one or more polymers with a first mixture comprising tailings;
   separating the combined first mixture and flocculant slurry into a first stream and a second stream, the second stream having a pH of at least 9.0; and
   combining a dosage of lime with the second stream to produce a second mixture having a pH greater than 11.8 and a soluble calcium concentration of at least 93 mg/L, the dosage of lime providing calcium cations that react with the tailings of the second mixture via pozzolanic reactions.

12. The method of claim 11, wherein:
   the flocculant comprises a flocculant slurry including the polymer and at least one of process water or makeup water,
   the flocculant slurry is combined with the first mixture in or prior to a thickener vessel, and
   the dosage of lime is combined with the second stream downstream of the thickener vessel.

13. The method of claim 11, wherein the polymer comprises an anionic polymer.

14. The method of claim 11, wherein the polymer comprises a nonionic, cationic, or amphoteric polymer.

15. The method of claim 11, wherein the polymer comprises a polyacrylamide.

16. The method of claim 11, wherein combining the dosage of lime comprises combining a second dosage of lime, the method further comprising, prior to combining the flocculant, combining a first dosage of lime with the tailings to form the first mixture.

17. The method of claim 16, wherein the tailings includes bicarbonates, and wherein combining the first dosage of lime comprises reducing the bicarbonates in the first mixture to be below about 100 mg/L.

18. The method of claim 16, wherein the first mixture includes an alkalinity, and wherein combining the first dosage reduces the alkalinity of the first mixture to be below about 130 mg/L of calcium carbonate equivalent.

19. The method of claim 11, wherein the first mixture has a pH less than 11.5 and the second mixture has a pH greater than 12.4.

20. The method of claim 11, further comprising pumping the second mixture to a pond or reclamation area.

* * * * *